United States Patent [19]

Zijlstra

[11] 4,141,384

[45] Feb. 27, 1979

[54] WATER TAPS

[75] Inventor: Jan G. H. Zijlstra, Auckland, New Zealand

[73] Assignee: AHI Operations Limited, Auckland, New Zealand

[21] Appl. No.: 896,406

[22] Filed: Apr. 14, 1978

Related U.S. Application Data

[63] Continuation of Ser. No. 722,295, Sep. 10, 1976, abandoned.

[30] Foreign Application Priority Data

Sep. 23, 1975 [NZ] New Zealand .................. 178763

[51] Int. Cl.² ............................................ F16K 11/20
[52] U.S. Cl. ................................. 137/883; 137/606; 137/886
[58] Field of Search ............... 4/192; 137/561 R, 606, 137/861, 886, 883

[56] References Cited

U.S. PATENT DOCUMENTS

| 1,557,808 | 10/1925 | Dale ..................................... 137/606 |
| 1,911,285 | 5/1933 | O'Brien ............................ 137/606 X |
| 2,138,503 | 11/1938 | O'Brien ............................ 137/606 X |
| 3,270,352 | 9/1966 | Kerwin ............................ 137/886 X |

FOREIGN PATENT DOCUMENTS 166488  3/1973  New Zealand .......................... 137/886

Primary Examiner—Gerald A. Michalsky
Attorney, Agent, or Firm—Ladas, Parry, Von Gehr, Goldsmith & Deschamps

[57] ABSTRACT

A tap having a pair of chambers joined by a fluid passage and an outlet from each chamber. An inlet is provided to one chamber and a valve controls the flow between the two chambers. Thus the flow from one outlet is uncontrollable and the flow from the other outlet is controllable. Also a tap assembly having two inlets and control members to control the flow to a common spout. The control members also permit uncontrolled flow from each inlet to another outlet in which a further control member is provided.

6 Claims, 2 Drawing Figures

WATER TAPS

This is a continuation of co-pending application Ser. No. 722,295 filed Sept. 10, 1976, now abandoned.

This invention relates to tap assemblies and control members therefor.

The complete specification accompanying New Zealand Pat. No. 166,488 describes a laundry tub cabinet wherein the tub drainage means, water supply lines to the laundry tub and water supply lines to a washing machine are housed within a localised area within the cabinet structure as an integral device. Such a construction has proven successful but it has been thought desirable to reduce the labour and materials content of such cabinets if possible and to improve construction to reduce the number of plumbing connections and welds.

It is therefore an object of the present invention to provide a tap assembly and control members therefor which will go at least some way towards meeting the foregoing desiderata in a simple yet effective manner or which will at least provide the public with a useful choice.

Accordingly in one aspect the invention consists in a control member for fluid flow including two chambers, an inlet to one chamber, at least one outlet from each chamber, a fluid path between said chambers and a valve member movable to close said fluid path between said chambers without substantially affecting fluid flow between the inlet and outlet from the chamber having the inlet thereto.

In a further aspect the invention consists in a tap assembly comprising one or more inlets, the or each inlet having a plurality of outlets associated therewith, first control means to allow or substantially prevent flow from at least one outlet associated with each inlet, each outlet through which flow is not controlled having second control means therein to allow or substantially prevent flow therethrough.

To those skilled in the art to which this invention relates many changes in construction and widely differing embodiments and applications of the invention will suggest themselves without departing from the scope of the invention as defined in the appended claims. The disclosures and the description herein are purely illustrative and are not intended to be in any sense limiting.

One preferred form of the invention will now be described with reference to the accompanying drawings in which.

Figure 2:
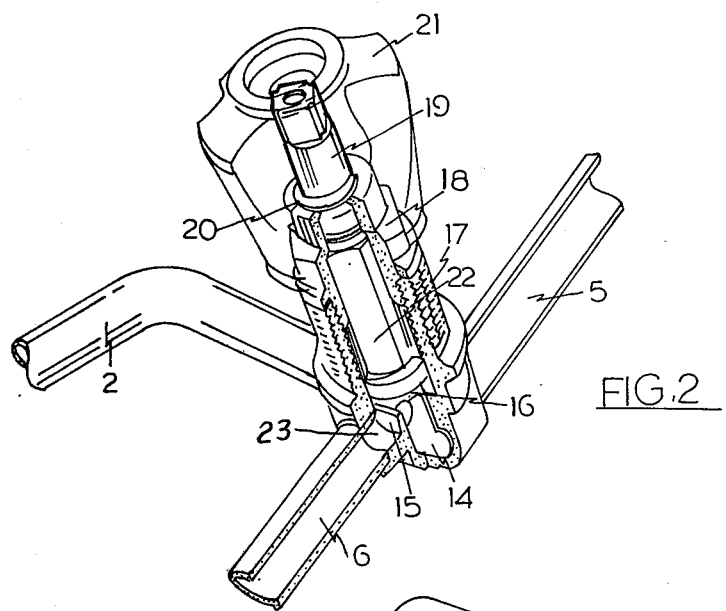
FIG. 2 is a cut-away perspective view of one control member for use in a tap according to the invention.
Figure 1:
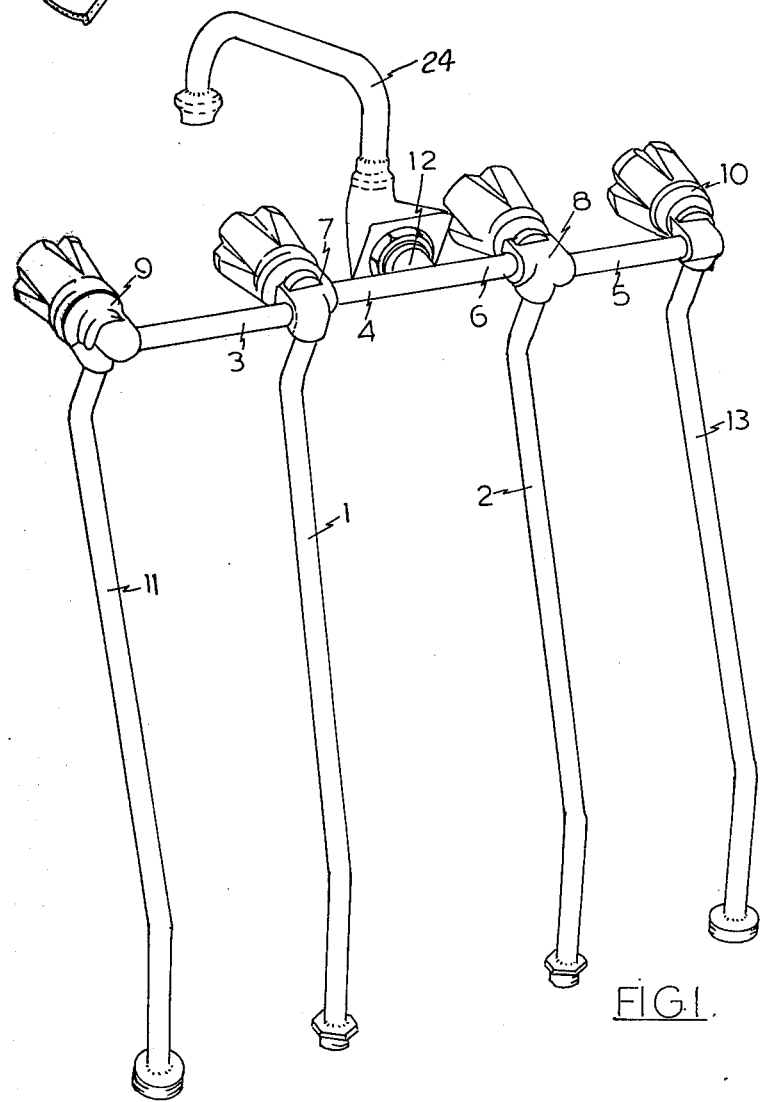
FIG. 1 is a perspective view of a tap assembly according to the invention.

In the preferred form of the invention a tap assembly is constructed as follows.

One or more inlets are provided and there are preferably two main inlets represented by pipes 1 and 2 and each inlet leads through a control member to a plurality of outlets. Thus, there may be two outlets, for example, outlets 3 and 4 fed by inlet 1 and outlets 5 and 6 fed by inlet 2.

Control members 7 and 8 are provided which include valves 16 which operate to control the flow through at least one outlet therefrom and for example, the control member 7 may control the flow through the outlet 4 from the inlet 1. Thus, flow through the outlet 4 may be allowed or substantially prevented by means of the control member 7.

Flow through the outlet 3 is not controlled by the control member 7 but a further control member 9 is provided and, likewise, a further control member 10 is provided for the outlet 13.

Thus, the control member 9 is operable to allow or substantially prevent flow through the outlet 11.

At least one of the outlets from the first control members such as control members 7 and 8 are brought together to form a common outlet and, thus, the common outlet may be formed by a T junction, the stem outlet 12 of which leads, for example, to a spout 13 and the arms of the T junction are formed by the outlet pipes 4 and 6.

The inlets 1 and 2 are preferably substantially at right angles to the outlets 3, 4, 5 and 6 and the outlets 3, 4, 5 and 6 lie substantially on the same line, although owing to the construction of the control members 7 and 8, there may be some displacement of the outlets 4 and 6 from the outlets 3 and 5 as shown in the drawings.

The outlet pipes 11 and 13 preferably lie substantially parallel to the inlets 1 and 2.

With this construction the control members 7, 8, 9 and 10 therefore preferably lie along a single line such that when installed, for example in a cabinet, the handle parts of the control members 7, 8, 9 and 10 protrude through a facing member to present an attractive appearance.

The control members 7 and 8 may be of the type shown in FIG. 2 in which an inlet pipe 2 feeds outlets 5 and 6.

The tap comprises a chamber 14 which is fed by the inlet 2 and from which at least one and preferably one outlet such as the outlet 5 leads directly. A further chamber 23 is provided and the chamber 23 also has at least one and preferably one outlet therefrom. A fluid path is provided between the chambers.

Between the chamber 14 and the outlet 6 a valve is provided which is operable to open or close the fluid path between chambers 14 and 23 and this may comprise a rib or valve seat 15 which is engaged by a sealing member such as a sealing washer 16 which also engages the side walls of the chamber. Control mechanism is provided to allow the sealing washer 16 to be raised or lowered and in FIG. 2 the washer 16 is shown in a substantially raised position. This arrangement allows substantial water flow for small opening movements of the sealing washer 16.

Thus, the chamber 14 may have the walls thereof extended upwardly at 17, being threaded on the inner surface thereof.

An apertured head 18 is then provided, also threaded such that the head 18 may be screwed into the walls 17.

A spindle 19 protrudes through the aperture provided in the top of the head 18 and is located, for example, by a spring C washer 20 or other manner. The construction is such that rotation of the spindle 19 by handle 21 will cause a plunger block 22 which mounts the sealing washer 16 to be raised or lowered by means of male and female threads engaging between the spindle 19 and plunger block 22 or the arrangement may fit another type of tap construction.

The construction shown in FIG. 2 corresponds to the control member 8 and the control member 7 is substantially identical, althouth opposite handed.

Also the control members 9 and 10 are similar in concept except that the additional outlets such as 5 or 3 are not provided. Thus, the control members 9 and 10 are substantially valves in which the outlets are turned 90° from the inlets.

The use of the invention is as follows.

The tap arrangement may be used in a cabinet such as described in the complete specification accompanying New Zealand Pat. No. 166,488 or in other similar applications.

In any event the inlets 1 and 2 are connected to a water supply such as hot and cold water supplies and the common outlet spout 24 is positioned, for example, over a bowl, tub, trough or the like.

The outlets 11 and 13 are led, for example, to an additional appliance such as an automatic washing machine in order that hot and cold water may be supplied thereto.

With each of the control members 7, 8, 9 and 10 initially closed, water will flow through inlets 1 and 2 and through outlets 3 and 5 but no water flow will occur in outlets 4 and 6 and outlets 11 and 13.

If valve 7 is opened, water flow will take place through outlet 4 to spout 24 and similarly if valve 8 is opened. Thus, rotation of the handle 21 causes the plunger member 22 to be raised, lifting the sealing washer 16 from the seat 15, allowing water to flow from the chamber 14 across the seat 15 into chamber 23 and to the outlet 6 or 4.

Opening of either control members 9 or 10 will cause water flow to occur in outlet pipes 11 or 13.

Thus, it can be seen that a tap assembly is provided which is particularly useful in conjunction with the invention described in the complete specification accompanying New Zealand Pat. No. 166,488 but, of course, other uses for the construction are envisaged.

The construction is particularly useful as it can be constructed without any bends or junctions being required in the piping and no T connectors are required on the inlet pipes 1 or 2. Thus all pipes are connected to the control members without the need of intervening connections or junctions.

Such constructions have the advantage that labour and welding materials and components are saved and also a lesser number of joints are required which reduces the number of possible leaks and number of welds which must be made and the construction is therefore advantageous from this viewpoint also.

I claim:

1. A tap assembly comprising:

a pair of first control members for liquid flow, each first control member including a unitary valve body defining therewithin first and second chambers and a liquid path between said chambers, and also defining an inlet to said first chamber and one outlet from each chamber, and each first control member also including a valve member movable to close said liquid path between said chambers without substantially affecting liquid flow between said inlet to said first chamber and said outlet from said first chamber, said inlet and each of said outlets having respective axes, the axes of said outlets being substantially parallel to each other and the axis of said inlet being substantially at right angles to the axes of said outlets;

a pair of second control members for liquid flow, each second control member including a unitary valve body defining an inlet and an outlet having respective axes which are substantially at right angles to each other;

a first pipe connecting the outlet of one of said first chambers to the inlet of one of said second control members;

a second pipe connecting the outlet of the other of said first chambers to the inlet of the other of said second control members; and a T intersection pipe having a cross member with two opposite ends, said two opposite ends being connected respectively to the outlets of said second chambers, said control members being located along substantially the same line.

2. A tap assembly as claimed in claim 1, wherein said chambers have a rib therebetween, and said control member includes a sealing washer engagable with said rib to substantially prevent liquid flow past said rib, thus preventing liquid flow through the outlet from said second chamber, flow through the outlet from said first chamber being substantially unaffected by movement of said sealing washer.

3. A tap assembly comprising:

a pair of first control members for liquid flow, each first control member including a unitary valve body defining therewithin first and second chambers and a liquid path between said chambers, and also defining an inlet to said first chamber and one outlet from each chamber, and each first control member also including a valve member movable to close said liquid path between said chambers without substantially affecting liquid flow between said inlet to said first chamber and said outlet from said first chamber, said inlet and each of said outlets having respective axes, the axes of said outlets being substantially collinear with each other and the axis of said inlet being substantially at right angles to the axes of said outlets;

a pair of second control members for liquid flow, each second control member including a unitary valve body defining an inlet and an outlet having respective axes which are substantially at right angles to each other;

a first pipe connecting the outlet of one of said first chambers to the inlet of one of said second control members;

a second pipe connecting the outlet of the other of said first chambers to the inlet of the other of said second control members; and a T intersection pipe having a cross member with two opposite ends, said two opposite ends being connected respectively to the outlets of said second chambers, said control members being located along substantially the same line.

4. A tap assembly as claimed in claim 3, wherein said chambers have a rib therebetween, and said control member includes a sealing washer engagable with said rib to substantially prevent liquid flow past said rib, thus preventing liquid flow through the outlet from said second chamber, flow through the outlet from said first chamber being substantially unaffected by movement of said sealing washer.

5. A tap assembly comprising:

a pair of first control members for liquid flow, each first control member including a unitary valve body defining therewithin first and second chambers and a liquid path between said chambers, and also defining an inlet to said first chamber and one outlet from each chamber, and each first control member also including a valve member movable to close said liquid path between said chambers without substantially affecting liquid flow between said inlet to said first chamber and said outlet from said first chamber, said inlet and each of said outlets having respective axes, the axes of said outlets being substantially parallel to each other and the axis of said inlet being substantially at right angles to the axes of said outlets;

a pair of second control members for liquid flow, each second control member including a unitary valve body defining an inlet and an outlet having respective axes which are substantially at right angles to each other;

a first pipe connecting the outlet of one of said first chambers to the inlet of one of said second control members;

a second pipe connecting the outlet of the other of said first chambers to the inlet of the other of said second control members; and a T intersection pipe having a cross member with two opposite ends, said two opposite ends being connected respectively to the outlets of said second chambers, said control members being located along substantially the same line, the axes of said inlets of said first control members being substantially parallel to each other and to the axes of the outlets of said second control members, the outlet of said one of said first chambers being substantially coaxial with the inlet of said one of said second control members, the outlet of said other of said first chambers being substantially coaxial with the inlet of said other of said second control members, and said outlets of said second chambers being substantially coaxial with each other.

6. A tap assembly comprising:

a pair of first control members for liquid flow, each first control member including a unitary valve body defining therewithin first and second chambers and a liquid path between said chambers, and also defining an inlet to said first chamber and one outlet from each chamber, and each first control member also including a valve member movable to close said liquid path between said chambers without substantially affecting liquid flow between said inlet to said first chamber and said outlet from said first chamber, said inlet and each of said outlets having respective axes, the axes of said outlets being substantially collinear with each other and the axis of said inlet being substantially at right angles to the axes of said outlets;

a pair of second control members for liquid flow, each second control member including a unitary valve body defining an inlet and an outlet having respective axes which are substantially at right angles to each other;

a first pipe connecting the outlet of one of said first chambers to the inlet of one of said second control members;

a second pipe connecting the outlet of the other of said first chambers to the inlet of the other of said second control members; and a T intersection pipe having a cross member with two opposite ends, said two opposite ends being connected respectively to the outlets of said second chambers, said control members being located along substantially the same line, the axes of said inlets of said first control members being substantially parallel to each other and to the axes of the outlets of said second control members, the outlet of said one of said first chambers being substantially coaxial with the inlet of said one of said second control members, the outlet of said other of said first chambers being substantially coaxial with the inlet of said other of said second control members, and said outlets of said second chambers being substantially coaxial with each other.

* * * * *